United States Patent
Myers et al.

(10) Patent No.: US 10,095,229 B2
(45) Date of Patent: Oct. 9, 2018

(54) PASSENGER TRACKING SYSTEMS AND METHODS

(71) Applicant: Ford Global Technologies, LLC, Dearborn, MI (US)

(72) Inventors: Scott Vincent Myers, Camarillo, CA (US); Praveen Narayanan, San Jose, CA (US); Harpreetsingh Banvait, Sunnyvale, CA (US); Mark Crawford, Belleville, MI (US); Alexandru Mihai Gurghian, Palo Alto, CA (US); David Silver, San Mateo, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 102 days.

(21) Appl. No.: 15/264,329

(22) Filed: Sep. 13, 2016

(65) Prior Publication Data
US 2018/0074495 A1    Mar. 15, 2018

(51) Int. Cl.
| | | |
|---|---|---|
| *G05D 1/00* | (2006.01) | |
| *B60W 40/08* | (2012.01) | |
| *E05B 81/54* | (2014.01) | |
| *G06K 9/00* | (2006.01) | |
| *H04L 29/08* | (2006.01) | |

(52) U.S. Cl.
CPC .......... *G05D 1/0088* (2013.01); *B60W 40/08* (2013.01); *E05B 81/54* (2013.01); *G05D 1/0066* (2013.01); *G06K 9/00302* (2013.01); *G06K 9/00342* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 4,713,661 A | | 12/1987 | Boone |
| 5,719,950 A | * | 2/1998 | Osten .................... A61L 5/1171 340/5.82 |
| 6,502,030 B2 | | 12/2002 | Hilleary |
| 7,262,696 B2 | | 8/2007 | Aota |
| 7,602,947 B1 | | 10/2009 | Lemelson |
| 8,120,505 B2 | | 2/2012 | Bouressa |
| 8,417,414 B2 | | 4/2013 | Atri |
| 2004/0262940 A1 | | 12/2004 | Johnson |

(Continued)

FOREIGN PATENT DOCUMENTS

| | | |
|---|---|---|
| EP | 1369351 A2 | 12/2003 |
| EP | 1667084 A1 | 6/2006 |

(Continued)

*Primary Examiner* — Redhwan K Mawari
*Assistant Examiner* — Edward Torchinsky
(74) *Attorney, Agent, or Firm* — David R. Stevens; Stevens Law Group

(57) ABSTRACT

Example passenger validation systems and methods are described. In one implementation, a method receives, at a vehicle, a transport request indicating a passenger and a pick-up location. The vehicle drives to the pick-up location and authenticates the passenger at the pick-up location. If the passenger is successfully authenticated, the method unlocks the vehicle doors to allow access to the vehicle, determines a number of people entering the vehicle, and confirms that the number of people entering the vehicle matches a number of passengers associated with the transport request.

20 Claims, 10 Drawing Sheets

(56)  References Cited

U.S. PATENT DOCUMENTS

| | | | |
|---|---|---|---|
| 2006/0009905 A1 | 1/2006 | Soderberg | |
| 2010/0201505 A1 | 8/2010 | Honary | |
| 2013/0127616 A1 | 5/2013 | Robitaille | |
| 2014/0309866 A1 | 10/2014 | Ricci | |
| 2014/0309934 A1 | 10/2014 | Ricci | |
| 2015/0066284 A1* | 3/2015 | Yopp | B60W 30/00 701/29.2 |
| 2015/0379362 A1 | 12/2015 | Calmes | |
| 2017/0157521 A1* | 6/2017 | Comploi | A63G 25/00 |

FOREIGN PATENT DOCUMENTS

| | | |
|---|---|---|
| JP | 2012059274 A | 3/2012 |
| JP | 2013020293 A | 1/2013 |
| JP | 2015133050 A | 7/2015 |
| WO | WO-201599679 A1 | 7/2015 |

\* cited by examiner

PASSENGER TRACKING SYSTEMS AND METHODS

TECHNICAL FIELD

The present disclosure relates to vehicular systems and, more particularly, to systems and methods that identify and monitor passengers in a vehicle.

BACKGROUND

Automobiles and other vehicles provide a significant portion of transportation for commercial, government, and private entities. In some situations, a vehicle (such as an autonomous vehicle) transports passengers from a pick-up location to a destination location. For example, an autonomous vehicle may receive a transport request from a particular user. When fulfilling the transport request, the autonomous vehicle needs to identify the correct passenger at the pick-up location and transport that passenger to the desired destination location. Additionally, the passenger making the transport request needs to identify the correct autonomous vehicle that is fulfilling the transport request. Autonomous vehicles that do not have a human operator need to provide systems to automatically identify passengers and monitor passenger activity.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
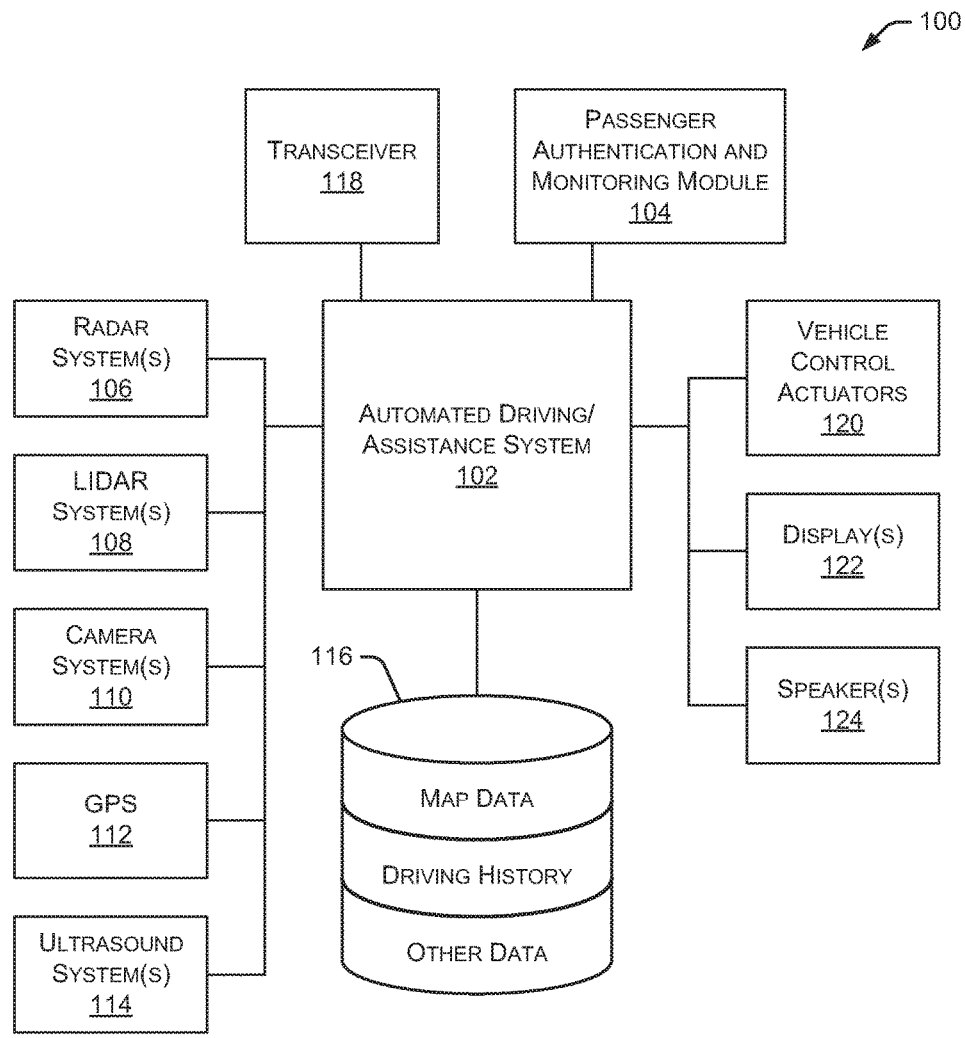
FIG. 1 is a block diagram illustrating an embodiment of a vehicle control system that includes a passenger validation and monitoring system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Various systems and methods are described herein for validating and tracking passengers entering and exiting an autonomous vehicle as well as monitoring passengers to determine health issues, such as physical impairment due to alcohol consumption or drug use. In this specification, the terms "reservation," "transport request," "transport reservation," and "reservation request" are used interchangeably to describe a user's request for transport from one or more pick-up locations to one or more destinations.

FIG. 1 is a block diagram illustrating an embodiment of a vehicle control system 100 that includes a passenger validation and monitoring system. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes a passenger authentication and monitoring module 104 that interacts with various components in the vehicle control system to fulfill transport requests, identify passengers, authenticate passengers, monitor passenger activity, and monitor passengers entering and exiting the vehicle. In one embodiment, passenger authentication and monitoring module 104 verifies that a passenger seeking access to the vehicle is the person who generated the transport request. In some embodiments, passenger authentication and monitoring module 104 monitors people entering and exiting the vehicle to be sure the correct number of people enter the vehicle (based on the number of people identified in the transport request) and the correct number of people exit the vehicle at the proper location. Passenger authentication and monitoring module 104 also monitors passengers to determine various health-related conditions, such as alcohol impairment. Although passenger authentication and monitoring module 104 is shown as a separate component in FIG. 1, in alternate embodiments, passenger authentication and monitoring module 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. Additionally, data store 116 may store information related to transport requests, such as pick-up locations, destinations, number of passengers, and identity information associated with the passengers. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118.

A path may also be determined based on a transport request that includes a pick-up location and a destination. The sensor systems/devices 106-110 and 114 may be used to obtain real-time sensor data so that the automated driving/assistance system 102 can assist a driver or drive a vehicle in real-time.

Figure 2:
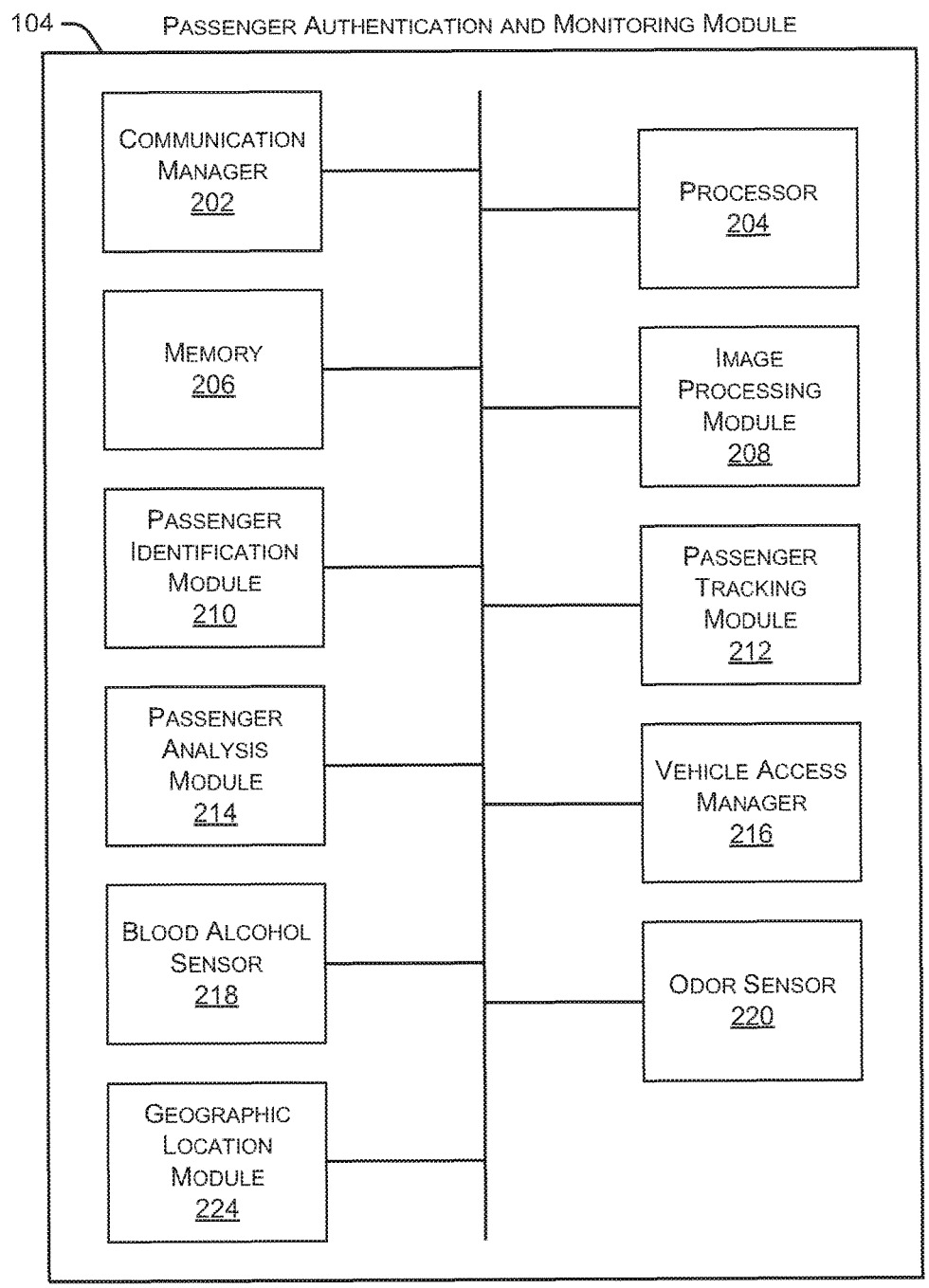
FIG. 2 is a block diagram illustrating an embodiment of a passenger authentication and monitoring module.

FIG. 2 is a block diagram illustrating an embodiment of passenger authentication and monitoring module 104. As shown in FIG. 2, passenger authentication and monitoring module 104 includes a communication manager 202, a processor 204, and a memory 206. Communication manager 202 allows passenger authentication and monitoring module 104 to communicate with other systems, such as automated driving/assistance system 102. Processor 204 executes various instructions to implement the functionality provided by passenger authentication and monitoring module 104 and discussed herein. Memory 206 stores these instructions as well as other data used by processor 204 and other modules contained in passenger authentication and monitoring module 104.

Additionally, passenger authentication and monitoring module 104 includes an image processing module 208 that receives image data from one or more cameras 110 and identifies, for example, faces, objects, and other items included in the images. In some embodiments, image processing module 208 includes a facial recognition algorithm that identifies a face of a person approaching the vehicle and matches that face with user profile data (including a user photo) associated with the user who made a transport request. A passenger identification module 210 identifies one or more passengers entering or exiting a vehicle. For example, passenger identification module 210 may verify (or authenticate) a person attempting to enter the vehicle to be certain the person is the user who made the transport request. This verification may be performed via facial recognition, an electronic handshake between passenger authentication and monitoring module 104 and a mobile device carried by the user, and the like. In some embodiments, the verification of a person attempting to enter the vehicle is performed using any type of biometric data, such as the person's height, weight, retina scan, fingerprint, palm veins, palm print, DNA, odor/scent, gait analysis, voiceprint, and the like. In other embodiments, a person is verified by presenting their driver's license (or other government identification), passport, credit card, password, personal identification number, or other data that is also stored in the user's profile. Passenger identification module 210 can also identify and record all passengers entering a vehicle at a particular pick-up location. This information is used at a later time to be sure the correct passengers exit the vehicle at the appropriate destination.

Passenger authentication and monitoring module 104 also includes a passenger tracking module 212 can count the number of passengers entering a vehicle at a pick-up location and determine that the same number of passengers exit the vehicle at the destination. Additionally, as discussed above with respect to passenger identification module 210, passenger tracking module 212 can assist with notifying appropriate passengers when arriving at their destination. This is particularly useful when multiple passengers in a vehicle are traveling to different destinations. The passenger tracking module 212 can also prevent passengers from exiting the vehicle at the wrong destination.

A passenger analysis module 214 analyzes passenger activities and behavior to identify impaired passengers, such as passengers who are impaired due to alcohol, drugs, or other health conditions. Passenger analysis module 214 can determine impaired passengers based on, for example, physical body movements, slurred speech, and the like. Additionally, passenger analysis module 214 may receive information from a blood alcohol sensor 218 and an odor sensor 220 which helps determine whether the passenger is impaired. For example, blood alcohol sensor 218 may determine the passenger's blood alcohol level using a breath sensor or other sensing mechanism. This blood alcohol information indicates a likelihood that the passenger is intoxicated. Similarly, odor sensor 220 may sense various odors (such as the smell of alcohol on the passenger's breath) and determine the likelihood that the passenger is impaired by alcohol or other substance. In some embodiments, if passenger analysis module 214 determines that the passenger is intoxicated, the passenger analysis module 214 instructs the automated driving/assistance system 102 to change the vehicle's driving characteristics to avoid sudden stops and sharp turns. Instead, the automated driving/assistance system 102 is instructed to drive in a smooth manner to minimize the likelihood of the passenger getting sick in the vehicle.

Passenger authentication and monitoring module 104 also includes a vehicle access manager 216 that controls access to the vehicle, such as locking and unlocking the doors of the vehicle. In some embodiments, vehicle access manager 216 keeps the vehicle's doors locked until a passenger has been authenticated as the person who made a transport request. When the passenger is authenticated, vehicle access manager 216 unlocks the vehicle doors to allow the passenger (and any guests) to enter the vehicle. A geographic location module 224 identifies the current location of the vehicle as well as the pick-up location and destination for a particular transport request. In some embodiments, geographic location module 224 determines a route between the vehicle's current location and a pick-up location, and determines a route between the pick-up location and a destination.

Figure 3:
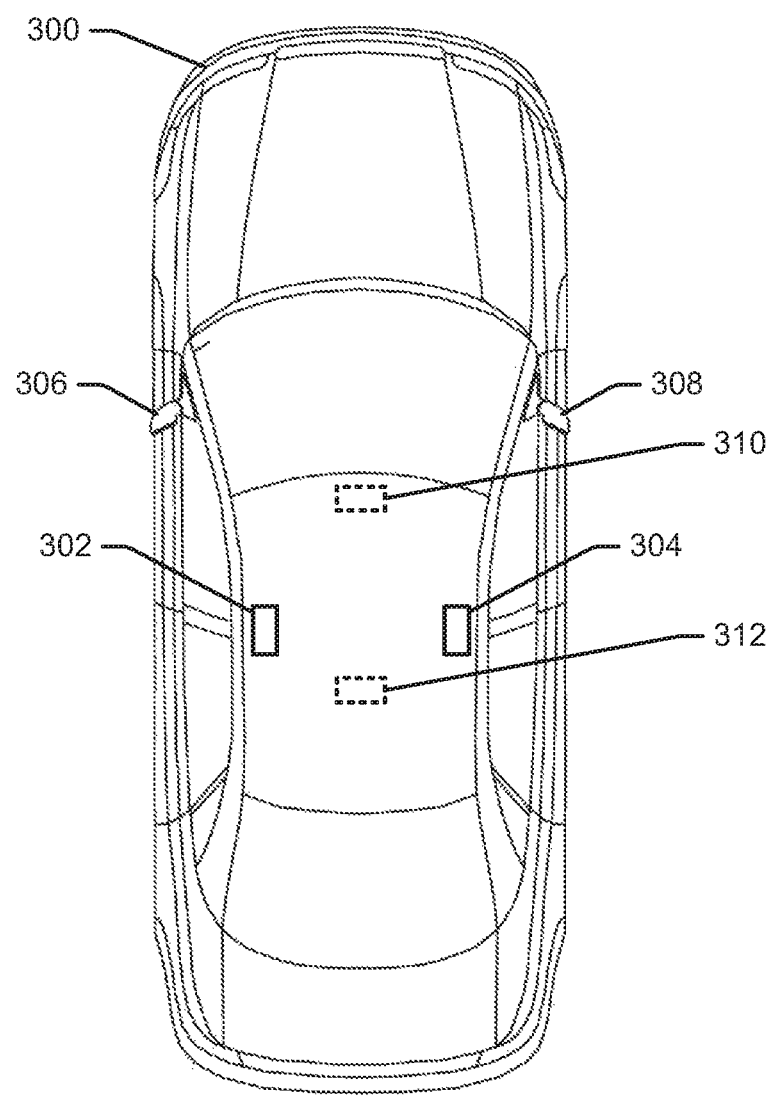
FIG. 3 illustrates an example vehicle with multiple vehicle-mounted cameras.

FIG. 3 illustrates an example vehicle 300 with multiple vehicle-mounted cameras. As shown in FIG. 3, vehicle 300 has two side-facing cameras 302 and 304, which may be mounted to the vehicle's roof, door, or other vehicle component. Side-facing cameras 302 and 304 are positioned such that each camera can capture images of people standing near the vehicle doors (e.g., passengers waiting to enter the vehicle). As discussed herein, images of people standing near the vehicle are useful in authenticating a person waiting to enter the vehicle (i.e., authenticating the person as the user who made a specific transport request for vehicle 300). In some embodiments, cameras 306 and 308 are mounted to (or mounted proximate) the vehicle's side-view mirrors. Cameras 306 and 308 may be side-facing, rear-facing or forward-facing. Additionally, vehicle 300 may include one or more interior cameras 310 and 312, which are positioned to capture images of passengers in the vehicle. In some embodiments, multiple interior cameras 310, 312 are used to capture images of passengers in all seating positions within the vehicle (e.g., front seats and rear seats) and facing in any direction (e.g., facing forward, rearward, or toward the side of the vehicle).

Figure 4A:
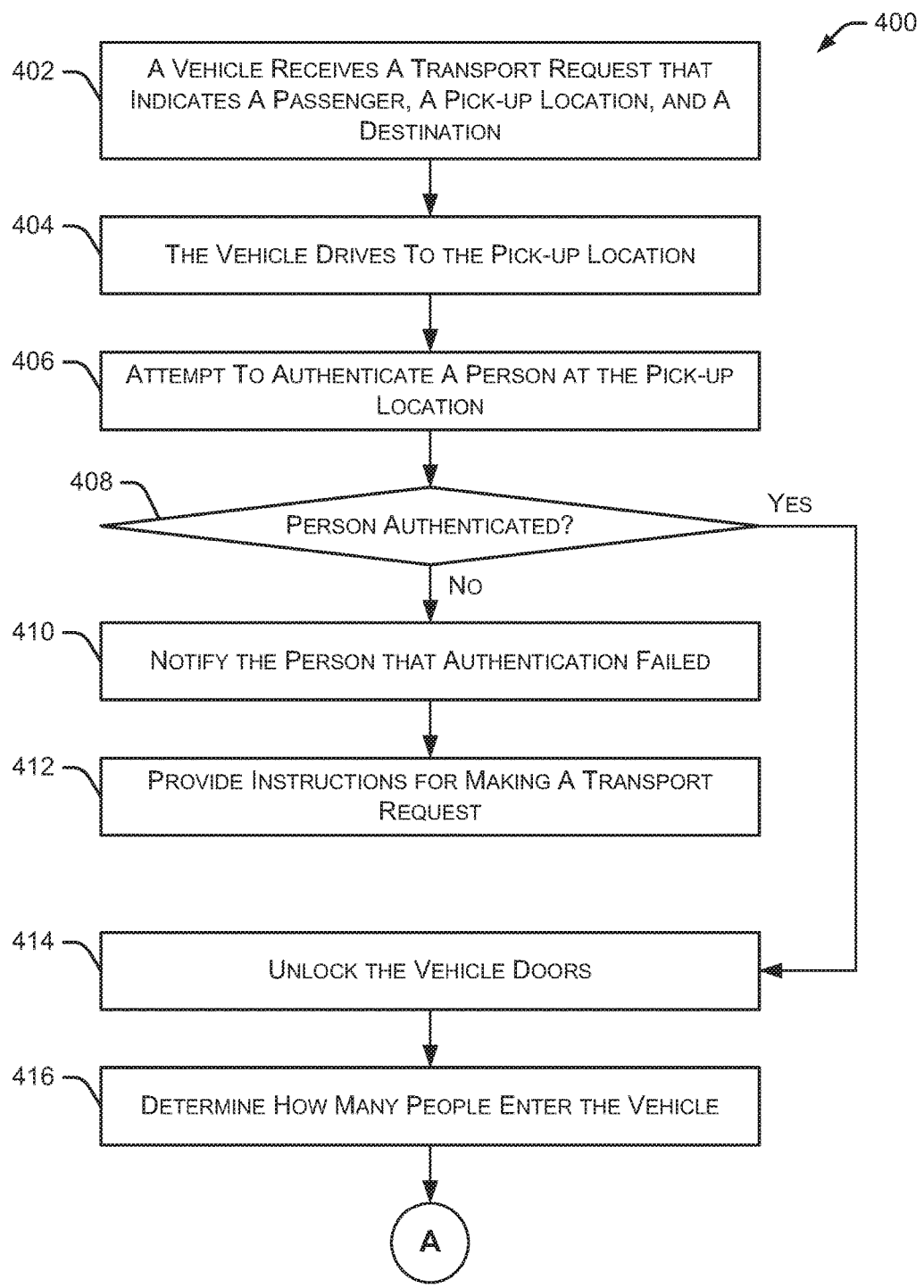
FIGS. 4A and 4B illustrate an embodiment of a method for fulfilling a transport request.
Figure 4B:
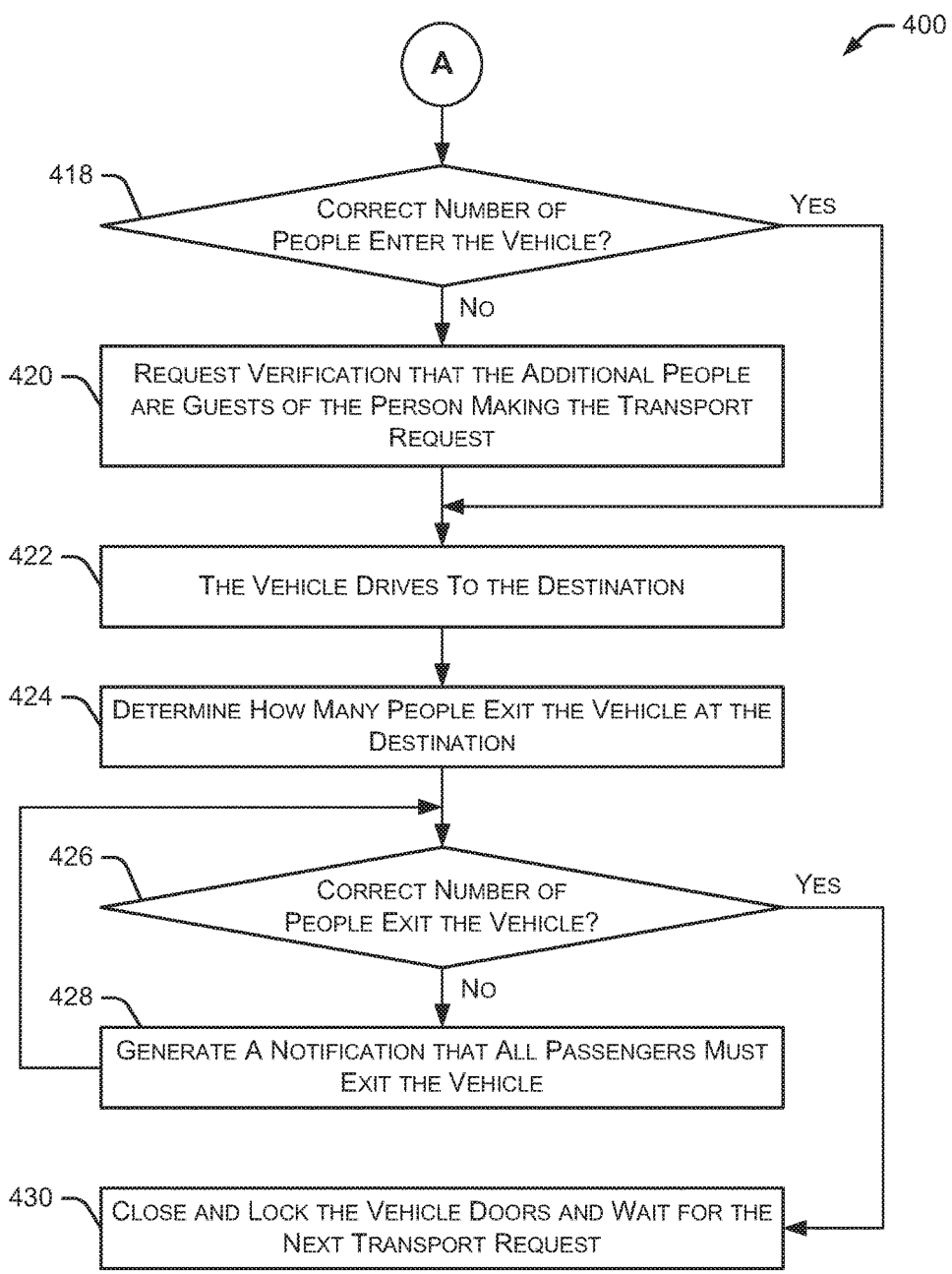

FIGS. 4A and 4B illustrate an embodiment of a method 400 for fulfilling a transport request. Initially, a vehicle (e.g., an autonomous vehicle) receives 402 a transport request that indicates a passenger, a pick-up location, and a destination. In some embodiments, the transport request also indicates one or more of a number of passengers being transported, multiple pick-up locations, and multiple destinations. The vehicle drives 404 to the pick-up location and attempts to authenticate 406 a person at the pick-up location. In some embodiments, a user making a transport request has a user profile that includes the user's name, address, travel preferences, and an image of the user. When authenticating a person at the pick-up location, passenger authentication and monitoring module 104 analyzes images of people standing near the vehicle (or walking toward the vehicle) to identify a face that matches the user profile image of the user making the transport request. This authentication process prevents the wrong person (i.e., not the person who made the transport request) from entering the vehicle. The authentication process may use a facial recognition algorithm, an electronic handshake between passenger authentication and monitoring module 104 and a mobile device carried by the user, and the like. In some embodiments, the passenger authentication and monitoring module 104 identifies a unique identifier associated with the user's mobile device based on information in the user's profile and determines whether the user is carrying a mobile device with the unique identifier.

In some embodiments, passenger authentication and monitoring module 104 provides notices and updates to the user making the transport request. For example, passenger authentication and monitoring module 104 may communicate vehicle location information, vehicle estimated time of arrival at the pick-up location, and the license plate number (or other identifier) of the vehicle to allow the passenger to easily identify the appropriate autonomous vehicle that will provide the transport service. In some embodiments, the passenger receives a map via a smartphone or other device showing the specific pick-up location.

If the vehicle cannot authenticate 408 a person located near the vehicle, method 400 continues by notifying 410 people located near the vehicle that the authentication failed. This gives the person another chance to authenticate their identity. Additionally, method 400 may provide instructions 412 to people located near the vehicle for making a transport request. In some embodiments, the vehicle may wait for a predetermined period of time (e.g., 5 minutes) to see if any of the people near the vehicle submit a transport request. After the predetermined time, the vehicle may respond to another transport request or drive to another location.

If the vehicle successfully authenticates 408 a person located near the vehicle, the vehicle unlocks the doors 414 to allow the person to enter the vehicle. In some embodiments, the person making the transport request may be traveling with one or more guests. In this situation, method 400 determines 416 how many people entered the vehicle. In some embodiments, a particular transport request includes the number of people who will be traveling from the pick-up location to the destination. The number of people entering the vehicle can be determined using a camera that monitors each person entering the vehicle, sensors in the vehicle that detect passengers, seat sensors that detect whether a particular seat is occupied, and the like. When using a camera to monitor people entering the vehicle, deep neural networks may be used to analyze video images and detect the number of different people.

If the correct number of people enter the vehicle 418 (i.e., the same number of people identified in the transport request), the vehicle drives 422 to the destination. However, if more people enter the vehicle than was identified in the transport request, method 400 requests verification 420 that the additional people are guests of the person making the transport request. Once verified, the vehicle drives 422 to the destination. In some situations, the person making the transport request may be charged extra for the additional passengers. If the additional people are not verified as guests, the vehicle may wait until the extra people exit the vehicle.

When the vehicle arrives at the destination, method 400 determines 424 how many people exit the vehicle at the destination. As mentioned above, the number of people entering the vehicle was determined at 416. If the correct number of people exit 426 the vehicle (i.e., the same number of people that entered the vehicle at the pick-up location), method 400 closes and locks 430 the vehicle doors and waits for the next transport request. If the correct number of people do not exit the vehicle, indicating there is still at least one person in the vehicle, method 400 generates 428 a notification that all passengers must exit the vehicle. After all passengers have exited the vehicle, method 400 closes and locks 430 the vehicle doors and waits for the next transport request. In some embodiments, the vehicle determines how many people exit the vehicle at the destination using one or more vehicle-mounted cameras, such as interior cameras and/or exterior cameras. In other embodiments, one or more interior cameras are used to determine whether any passengers remain in the vehicle before locking the vehicle doors. In additional embodiments, the vehicle may include seat sensors that detect the presence of a person in the seat. In these embodiments, the method determines whether the vehicle is empty by determining whether any of the seat sensors indicate the presence of a person in the seat.

In some embodiments, passenger authentication and monitoring module 104 detects fraud or forced entry into the vehicle. In these situations, passenger authentication and monitoring module 104 can automatically contact police, a vehicle owner, and the like. Additionally, passenger authentication and monitoring module 104 may use cameras to record the people attempting to fraudulently or forcibly enter the vehicle and communicate the recorded images to the police or other entities or individuals.

Figure 5A:
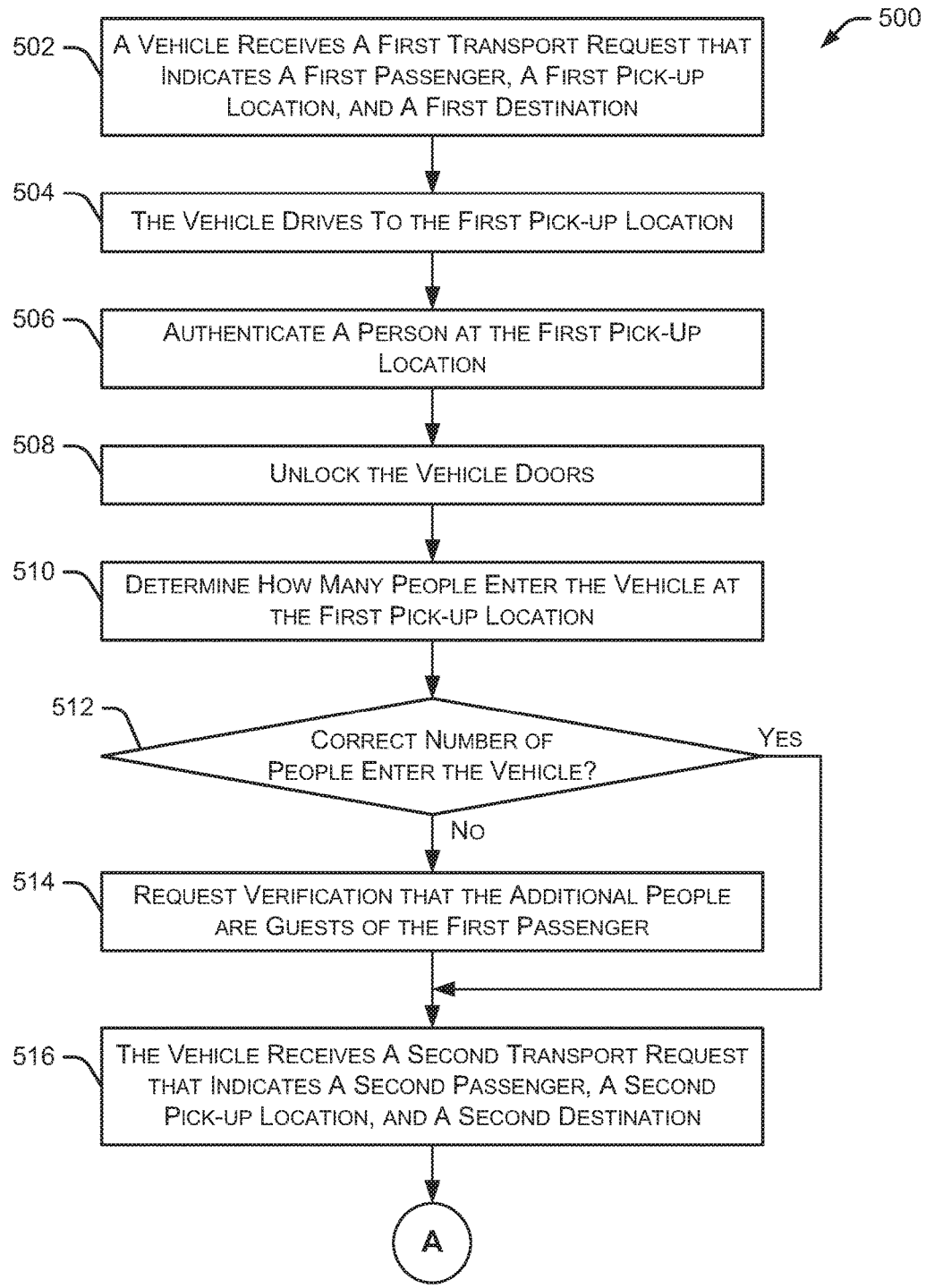
FIGS. 5A-5C illustrate an embodiment of a method for fulfilling a transport request that includes multiple pick-up locations and multiple destinations.
Figure 5B:
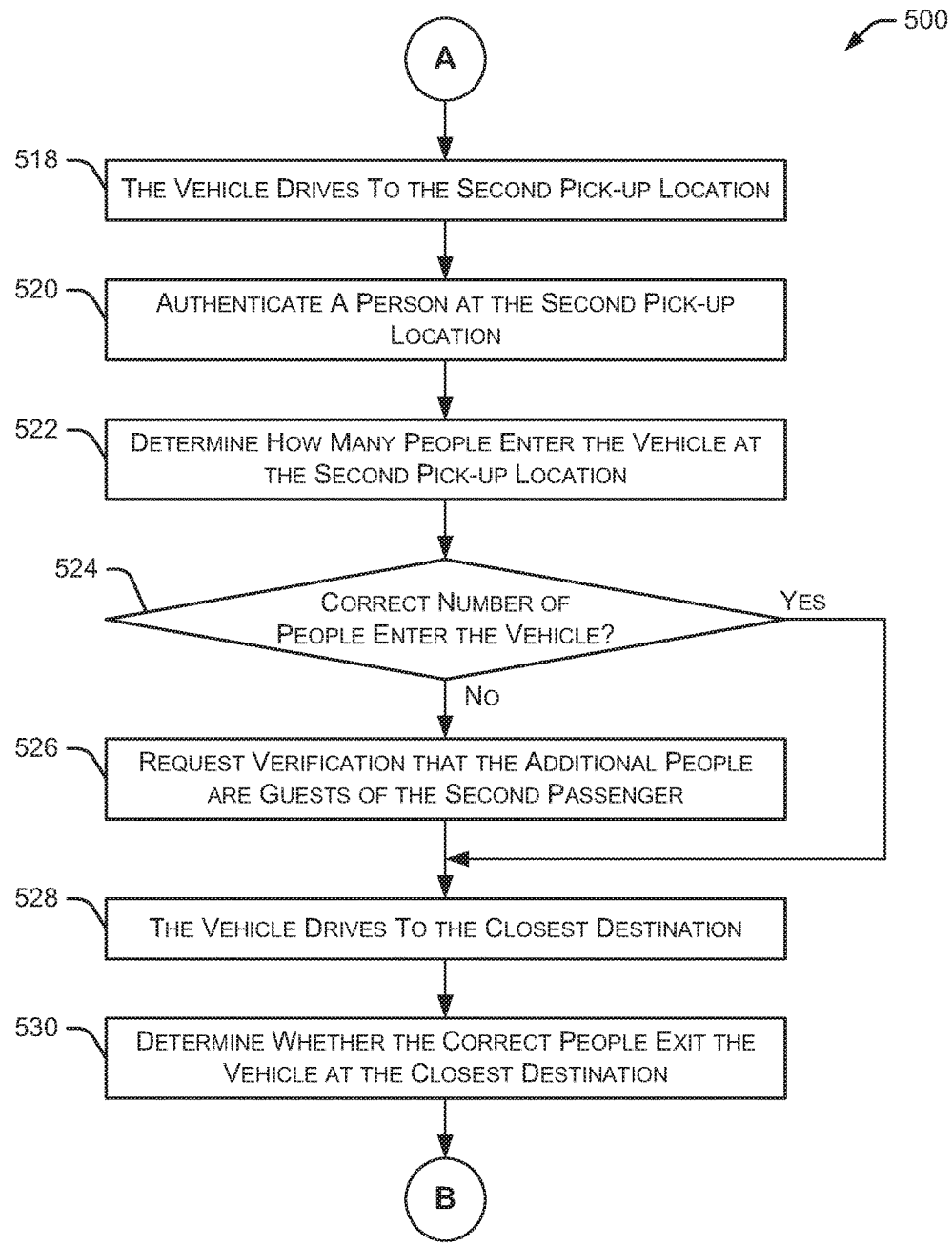
Figure 5C:
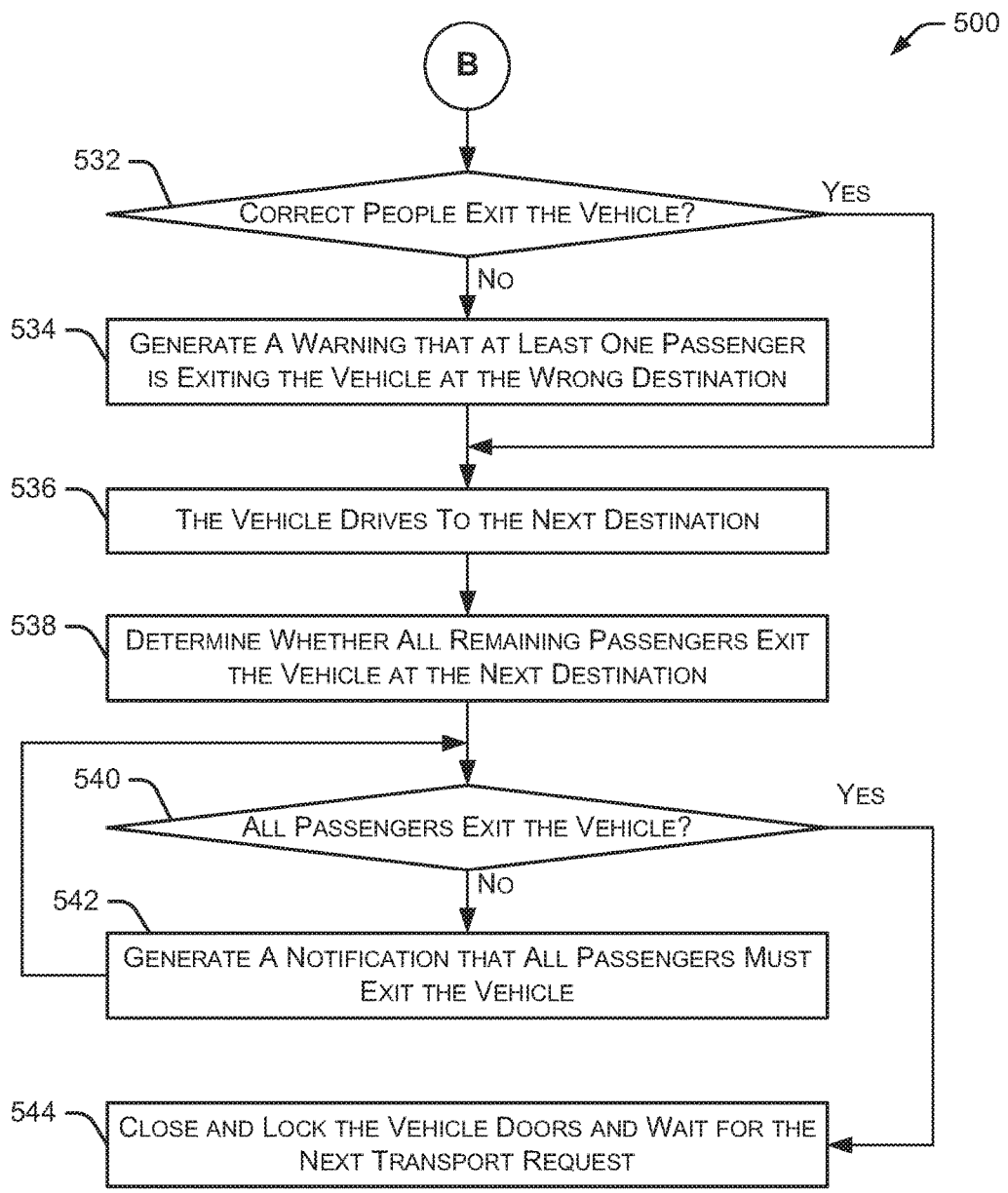

FIGS. 5A-5C illustrate an embodiment of a method 500 for fulfilling a transport request that includes multiple pick-up locations and multiple destinations. In some embodiments, multiple people enter the vehicle at one pick-up location but the multiple people request two or more different destinations. In other embodiments, multiple people may enter the vehicle at different pick-up locations, but all people have the same destination. Variations of method 500 can accommodate any of these situations.

Initially, a vehicle receives 502 a first transport request that indicates a first passenger, a first pick-up location, and a first destination. The vehicle drives 504 to the first pick-up location and authenticates 506 a person at the first pick-up location. The authentication 506 is similar to the authentication process discussed above with respect to FIGS. 4A and 4B. Method 500 continues by unlocking 508 the vehicle doors upon authentication of the person at the first pick-up location. Method 500 determines 510 how many people enter the vehicle at the first pick-up location. If an incorrect number of people enter 512 the vehicle at the first pick-up location, method 500 requests 514 verification that the additional people are guests of the first passenger. In some embodiments, method 500 may request a desired destination for each of the additional people. The method may charge an additional fee for the transport request to accommodate the additional people and/or additional destinations.

If the correct number of people enter 512 the vehicle at the first pick-up location, method 500 continues as the vehicle receives 516 a second transport request that indicates a second passenger, a second pick-up location, and a second destination. The vehicle then drives 518 to the second pick-up location and authenticates 520 a person at the second pick-up location. Method 500 then determines 522 how many people enter the vehicle at the second pick-up location. If an incorrect number of people enter 524 the vehicle at the second pick-up location, method 500 requests 526 verification that the additional people are guests of the second passenger. In some embodiments, method 500 may request a desired destination for each of the additional people. The method may charge an additional fee for the transport request to accommodate the additional people and/or additional destinations. In some embodiments, method 500 maintains a list of all passengers entering the vehicle and the destination associated with each passenger.

If the correct number of people enter 524 the vehicle at the second pick-up location, method 500 continues as the vehicle drives 528 to the closest destination, which may be the first destination or the second destination. Upon arrival at the closest destination, method 500 determines 530 whether the correct people exit the vehicle at the closest destination. For example, method 500 checks to determine that only the people who selected the particular destination exit the vehicle. If the correct people did not exit 532 the vehicle, method 500 provides a warning 534 that at least one passenger is exiting the vehicle at the wrong destination. In another situation, if at least one person was supposed to exit the vehicle, but remains inside the vehicle, a warning may be provided to that person reminding them that they have arrived at their desired destination.

After the correct people have exited the vehicle, the vehicle drives 536 to the next destination. Upon arrival at the next destination, method 500 determines 538 whether all remaining passengers exit the vehicle at that destination. If one or more passengers did not exit 540 the vehicle at the next destination, a notification is generated 542 indicating that all passengers must exit the vehicle. In some embodiments, passengers remaining in the vehicle are presented with an option to initiate a new transport request for a different destination. After all passengers have exited the vehicle, method 500 closes and locks 544 the vehicle doors and waits for the next transport request.

Figure 6A:
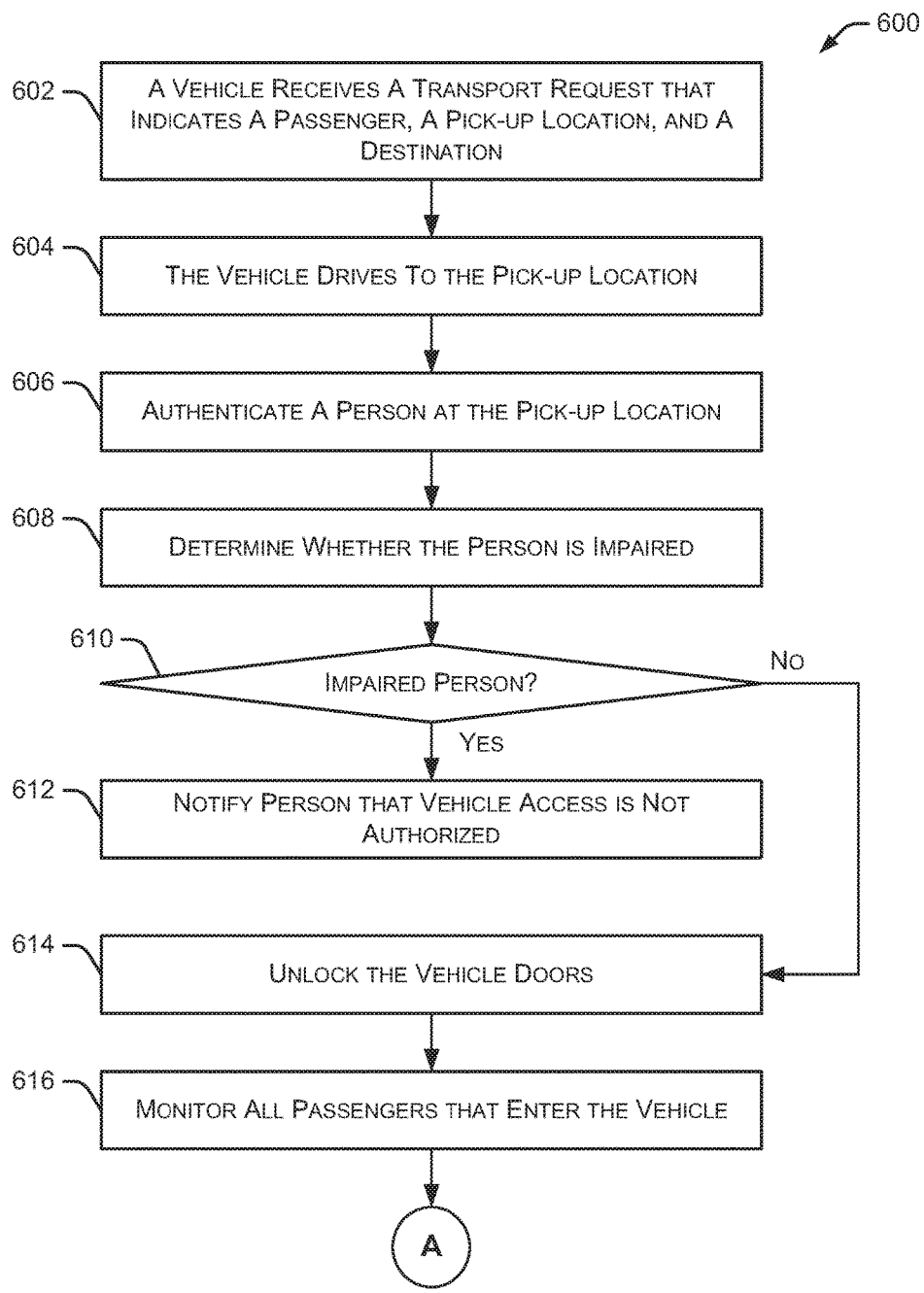
FIGS. 6A and 6B illustrate an embodiment of a method for monitoring passengers by an autonomous vehicle.
Figure 6B:
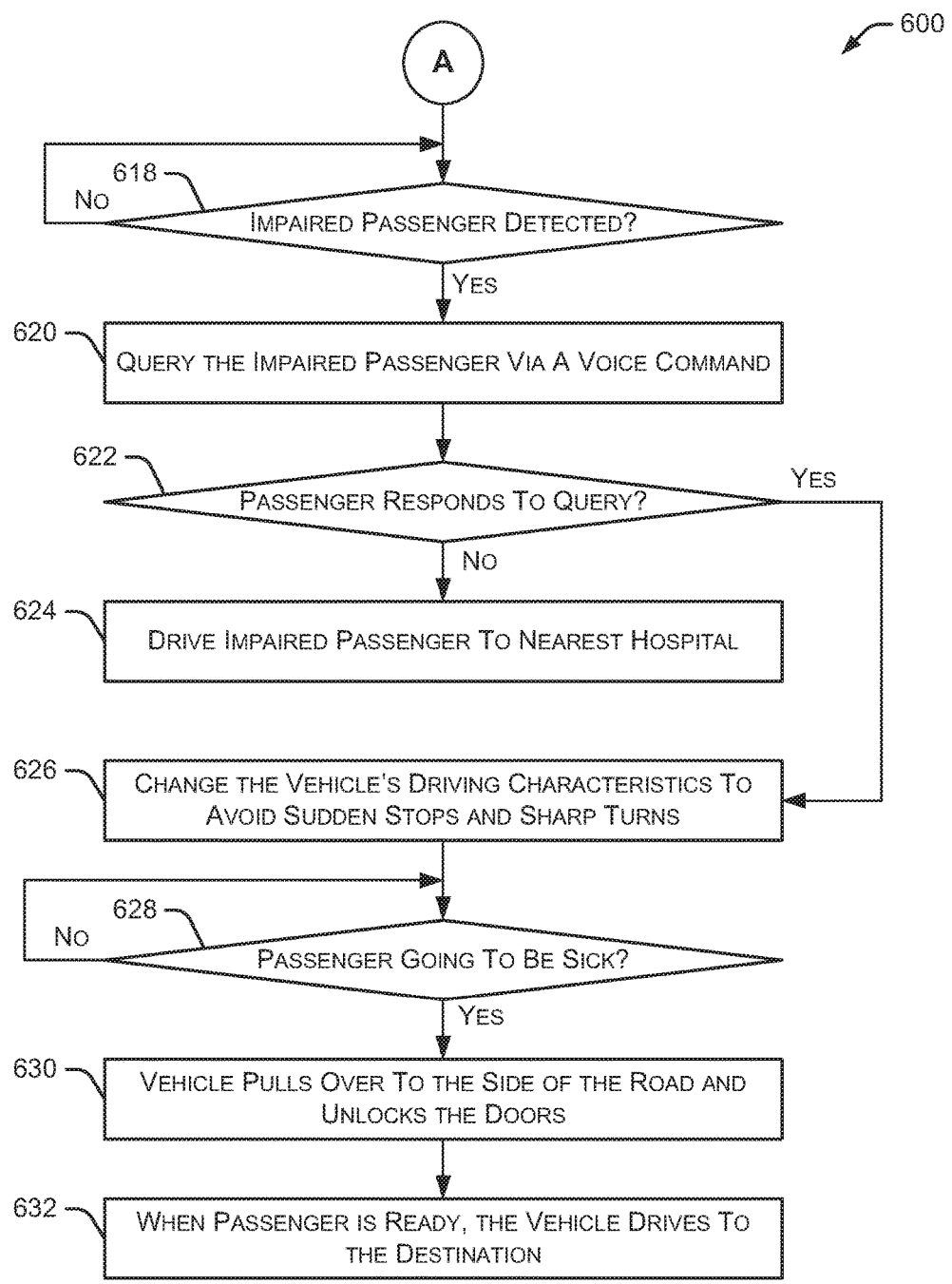

FIGS. 6A and 6B illustrate an embodiment of a method 600 for monitoring passengers by an autonomous vehicle. Initially, a vehicle receives 602 a transport request that indicates a passenger, a pick-up location, and a destination. The vehicle drives 604 to the pick-up location and authenticates 606 a person at the pick-up location. The authentication 606 is similar to the authentication process discussed above with respect to FIGS. 4A and 4B.

Method 600 continues by determining 608 whether the person is impaired. In some embodiments, passenger authentication and monitoring module 104 determines whether the person is impaired based on the passenger's facial expressions, body movements, and speech characteristics. In other embodiments, the person is determined to be impaired by monitoring the person's body movements (e.g., stumbling or irregular walking patterns) or speech (e.g., slurred speech). Additionally, in some embodiments, passenger authentication and monitoring module 104 may ask the person to perform a field sobriety test, such as walking heel-to-toe or reciting the alphabet. Passenger authentication and monitoring module 104 observes and analyzes the person's performance of the test and determines whether the person is impaired. If the person is determined 610 to be impaired, the person is notified 612 that vehicle access is not authorized.

However, if the person is determined 610 not to be impaired, the vehicle doors are unlocked 614 to allow access to the vehicle. After one or more passengers have entered the vehicle, all passengers are monitored 616 to detect impaired passengers or passengers with other health problems. For example, interior cameras, chemical (e.g., alcohol) sniffers/sensors, skin sensors (e.g., using seat belts, seating surfaces, or other items that are likely to come in contact with a passenger), voice analysis/response systems, and other alcohol sensing devices may be used to detect one or more impaired passengers. If an impaired passenger is detected 618, method 600 queries 620 the impaired passenger via a voice command. For example, the passenger may be asked how they are feeling or asked a simple question such as "What is your name?" If the passenger does not respond 622 to the query, the vehicle drives 624 the passenger to the nearest hospital or other medical facility. If the passenger responds 622 to the query, method 600 changes 626 the vehicle's driving characteristics to avoid sudden stops and sharp turns. In some embodiments, a non-responsive passenger may be in danger of becoming entangled in vehicle seat belts or other vehicle components. Additionally, the non-responsive passenger may be in the wrong position for an airbag deployment. Further, a passenger who has regurgitated is at risk for airway blockage due to fluids and the like. To identify these possible situations, some embodiments use interior microphones to monitor passenger breathing. Additionally, interior cameras may use deep neural networks to identify passenger distress and use pulse monitors (e.g., facial veins, skin contact sensors, or sound sensors) can also detect passenger distress.

Method 600 also determines 628 whether a passenger is likely to be sick. For example, passenger authentication and monitoring module 104 may identify verbal statements that are likely to indicate sickness, such as a request for air (e.g., putting opening a vehicle window), requesting to pull over, and the like. Additionally, cameras can use deep neural networks to detect signs of illness. If the passenger is likely to be sick, the vehicle pulls over 630 to the side of the road and unlocks the doors so the passenger can get out of the vehicle. When the passenger is ready, the vehicle drives 632 the passenger to the destination.

In some embodiments, the vehicle uses cameras, chemical odor sensors, and other systems to detect vomit, urine, spilled beverages, and the like inside the vehicle. If any of these items are detected, the vehicle drives to a maintenance center for cleaning before accepting any further transport requests.

In some embodiments of method 600, passengers are counted and authenticated in the same manner discussed herein with respect to methods 400 and 500.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
receiving, by a vehicle control system, a transport request at a vehicle, the transport request indicating a passenger and a pick-up location;
driving, by the vehicle control system, to the pick-up location;
receiving, by the vehicle control system, images from a side-facing camera mounted to the vehicle;
determining, by the vehicle control system, whether the passenger is impaired while the passenger is outside of the vehicle by evaluating whether the images indicate that the passenger has an irregular walking pattern; and
responsive to determining that the passenger is impaired, refraining, by the vehicle control system, from unlocking the vehicle doors.

2. The method of claim 1, wherein the vehicle is an autonomous vehicle.

3. The method of claim 1, further comprising determining whether the passenger is impaired prior to unlocking the vehicle doors.

4. The method of claim 1, further comprising:
authenticating at least one person at the pick-up location; and
responsive to successfully authenticating the person, unlocking vehicle doors to allow access to the vehicle.

5. The method of claim 1, further comprising:
determining whether the passenger is non-responsive; and
responsive to determining that the passenger is non-responsive, driving the passenger to a hospital.

6. The method of claim 5, wherein determining that the passenger is non-responsive includes querying the passenger via a voice command.

7. The method of claim 1, further comprising:
determining whether the passenger is going to be sick; and
responsive to determining that the passenger is going to be sick, driving the vehicle to the side of the road and unlocking the vehicle doors.

8. The method of claim 1, wherein determining whether the passenger is impaired includes analyzing the passenger's face to detect signs of impairment.

9. The method of claim 1, wherein determining whether the passenger is impaired includes analyzing the passenger's body movement to detect signs of impairment.

10. The method of claim 1, wherein determining whether the passenger is impaired includes analyzing the passenger's speech characteristics to detect signs of impairment.

11. A method comprising:
receiving, by a vehicle control system of a vehicle, a transport request at a vehicle, the transport request indicating a passenger, a pick-up location, and a destination;
driving, by the vehicle control system, to the pick-up location;
receiving, by the vehicle control system, images from a side-facing camera mounted to the vehicle;
determining, by the vehicle control system, whether the passenger is impaired while the passenger is outside of the vehicle by evaluating whether the images indicate that the passenger has an irregular walking pattern;
responsive to determining that the passenger is not impaired:
unlocking the vehicle doors and allowing the passenger to access the vehicle;
as the vehicle drives to the destination, monitoring the passenger to determine whether the passenger is sick or impaired; and
responsive to determining that the passenger is sick or impaired, changing the vehicle's driving characteristics to avoid sudden stops and sharp turns.

12. The method of claim 11, further comprising:
authenticating at least one person at the pick-up location prior to determining whether the passenger is impaired; and
responsive to successfully authenticating the person, continuing with determining whether the passenger is impaired.

13. The method of claim 11, further comprising:
determining whether the passenger is non-responsive; and
responsive to determining that the passenger is non-responsive, driving the passenger to a hospital.

14. The method of claim 13, wherein determining that the passenger is non-responsive includes querying the passenger via a voice command.

15. The method of claim 11, further comprising:
determining whether the passenger is going to be sick; and
responsive to determining that the passenger is going to be sick, driving the vehicle to the side of the road and unlocking the vehicle doors.

16. The method of claim 11, wherein determining whether the passenger is impaired includes analyzing the passenger's face to detect signs of impairment.

17. The method of claim 11, wherein determining whether the passenger is impaired includes analyzing the passenger's body movement to detect signs of impairment.

18. The method of claim 11, wherein determining whether the passenger is impaired includes analyzing the passenger's speech characteristics to detect signs of impairment.

19. An apparatus comprising:
a communication manager configured to receive a first transport request indicating a passenger, a pick-up location, and a destination;
an automated driving system configured to drive a vehicle to the pick-up location and the destination;
a vehicle access manager configured to:
receive images from a side-facing camera mounted to the vehicle;
determine whether the passenger is impaired while the passenger is outside of the vehicle by evaluating whether the images indicate that the passenger has an irregular walking pattern; and
when the passenger is determined to be impaired, refraining from unlocking the vehicle doors
when the passenger is not determined to be impaired unlock the vehicle doors and allow the passenger to access the vehicle.

20. The apparatus of claim 19, wherein the passenger analysis module is further configured to:
determine whether the passenger is non-responsive; and
responsive to determining that the passenger is non-responsive, instruct the automated driving system to drive the vehicle to a hospital.

* * * * *